(12) United States Patent
Romanski et al.

(10) Patent No.: US 6,398,542 B1
(45) Date of Patent: Jun. 4, 2002

(54) SLIDING VALVE GATE WITH INSERTS

(75) Inventors: Zbigniew Romanski, Mississauga (CA); Stanislaw Samotik, Strassen (LU)

(73) Assignee: Husky Injection Molding Systems, Ltd., Bolton (CA)

(*) Notice: Subject to any disclaimer, the term of this patent is extended or adjusted under 35 U.S.C. 154(b) by 0 days.

(21) Appl. No.: 09/562,038

(22) Filed: May 1, 2000

(51) Int. Cl.[7] ............................................... B29C 45/23
(52) U.S. Cl. ........................................ 425/564; 425/566
(58) Field of Search ................................. 425/562, 564, 425/563, 565, 566, 289

(56) References Cited

U.S. PATENT DOCUMENTS 4,077,760 A * 3/1978 Sauer .......................... 425/562
4,108,956 A    8/1978 Lee ............................. 264/329
4,380,423 A * 4/1983 Aoki ........................... 425/289
6,146,123 A * 11/2000 Lausenhammer et al. ... 425/562

FOREIGN PATENT DOCUMENTS

DE            441208         10/1995

* cited by examiner

*Primary Examiner*—Tim Heitbrink
(74) *Attorney, Agent, or Firm*—Katten Muchin Zavis

(57) ABSTRACT

A valve gating apparatus for injection molding including at least one shutter disposed between the gate and the cavity melt channel into a mold cavity. The shutter is removably fastened to a rail member. When the rail member is moved laterally, the shutter moves between a closed position wherein flow of melt from the nozzle into the cavity is inhibited, and an open position wherein flow of melt into the cavity is unimpeded by the shutter.

14 Claims, 21 Drawing Sheets

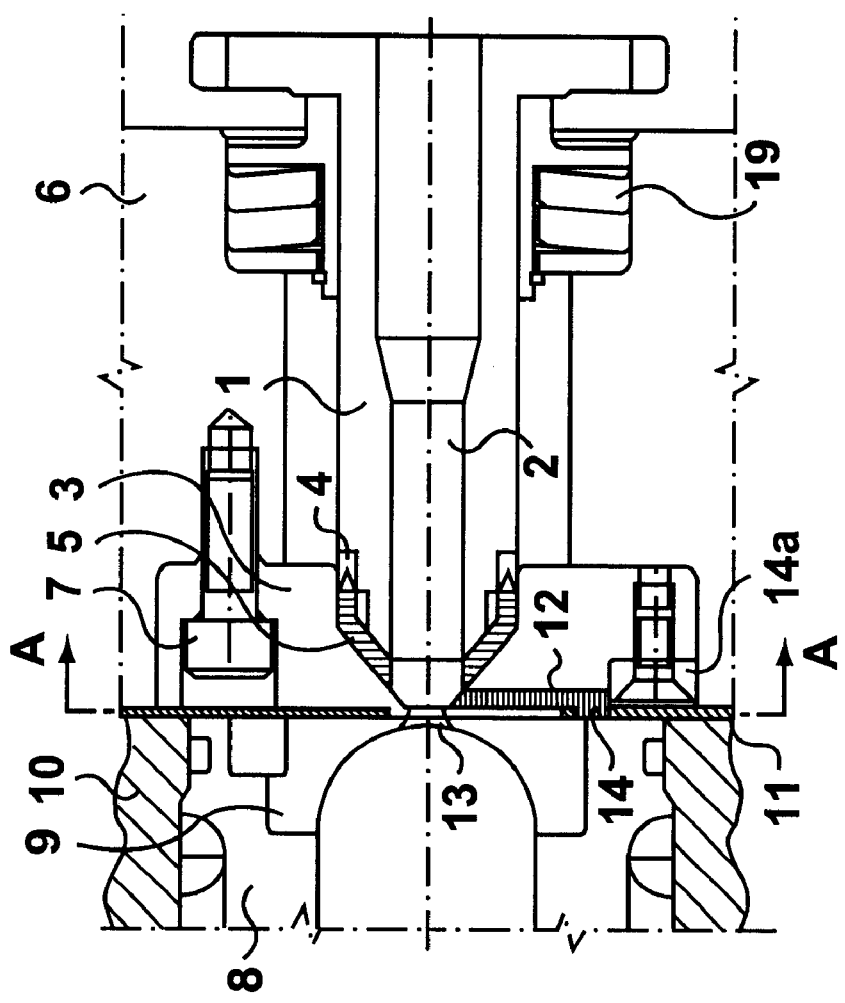
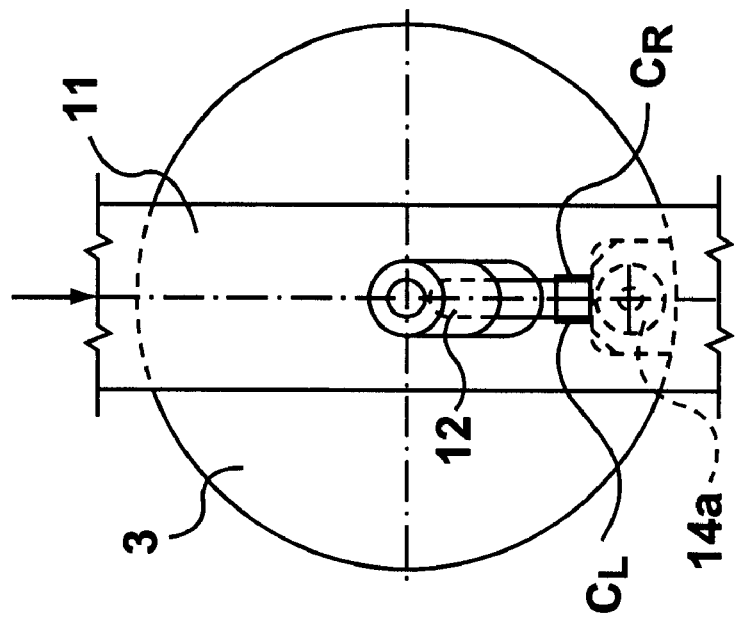
FIG. 1

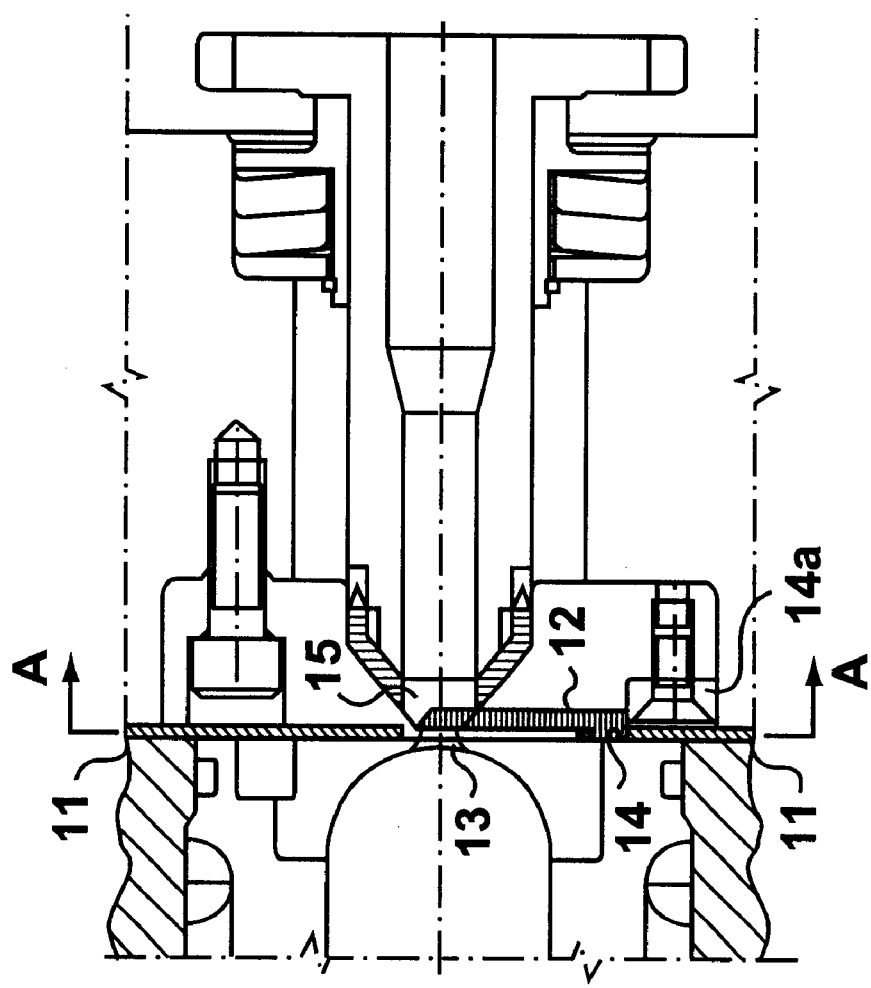
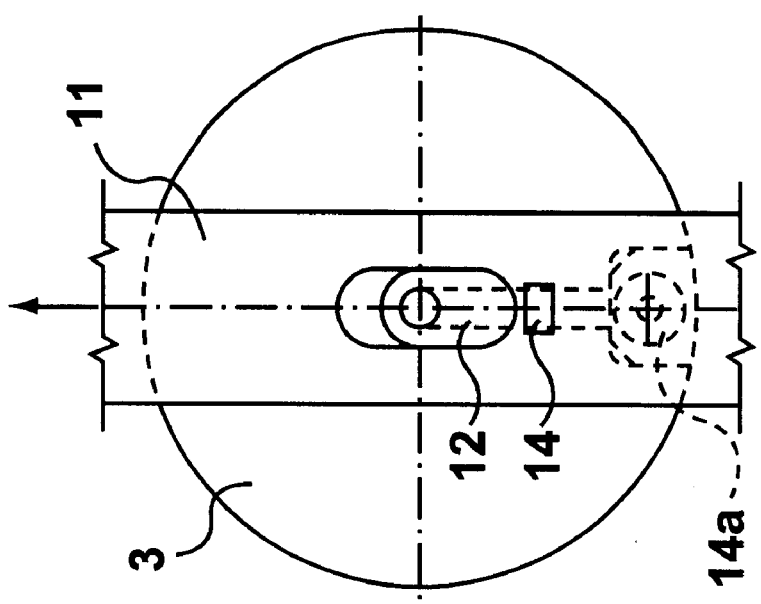
FIG. 2

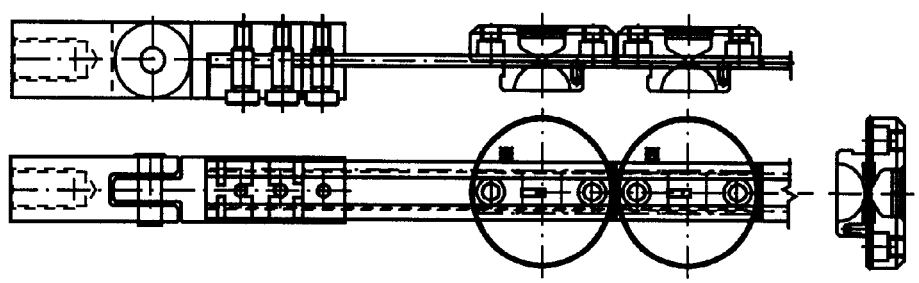
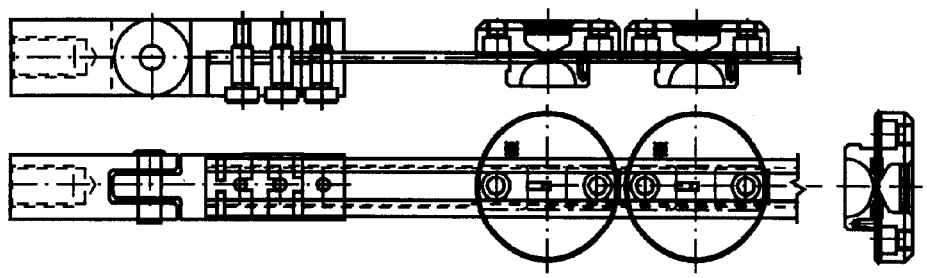
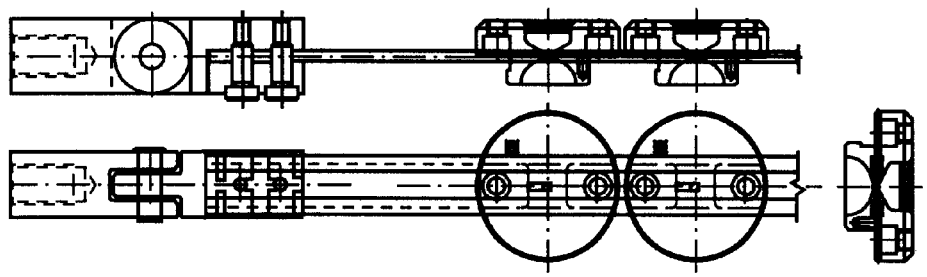
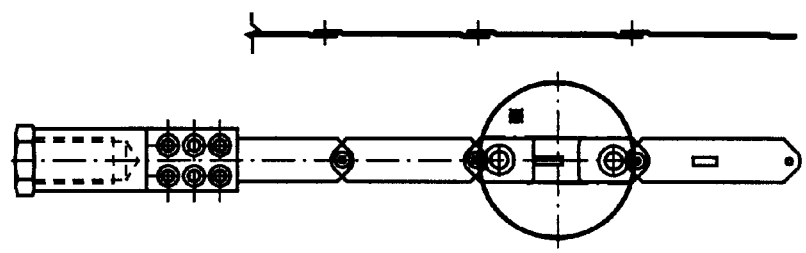
FIG. 12

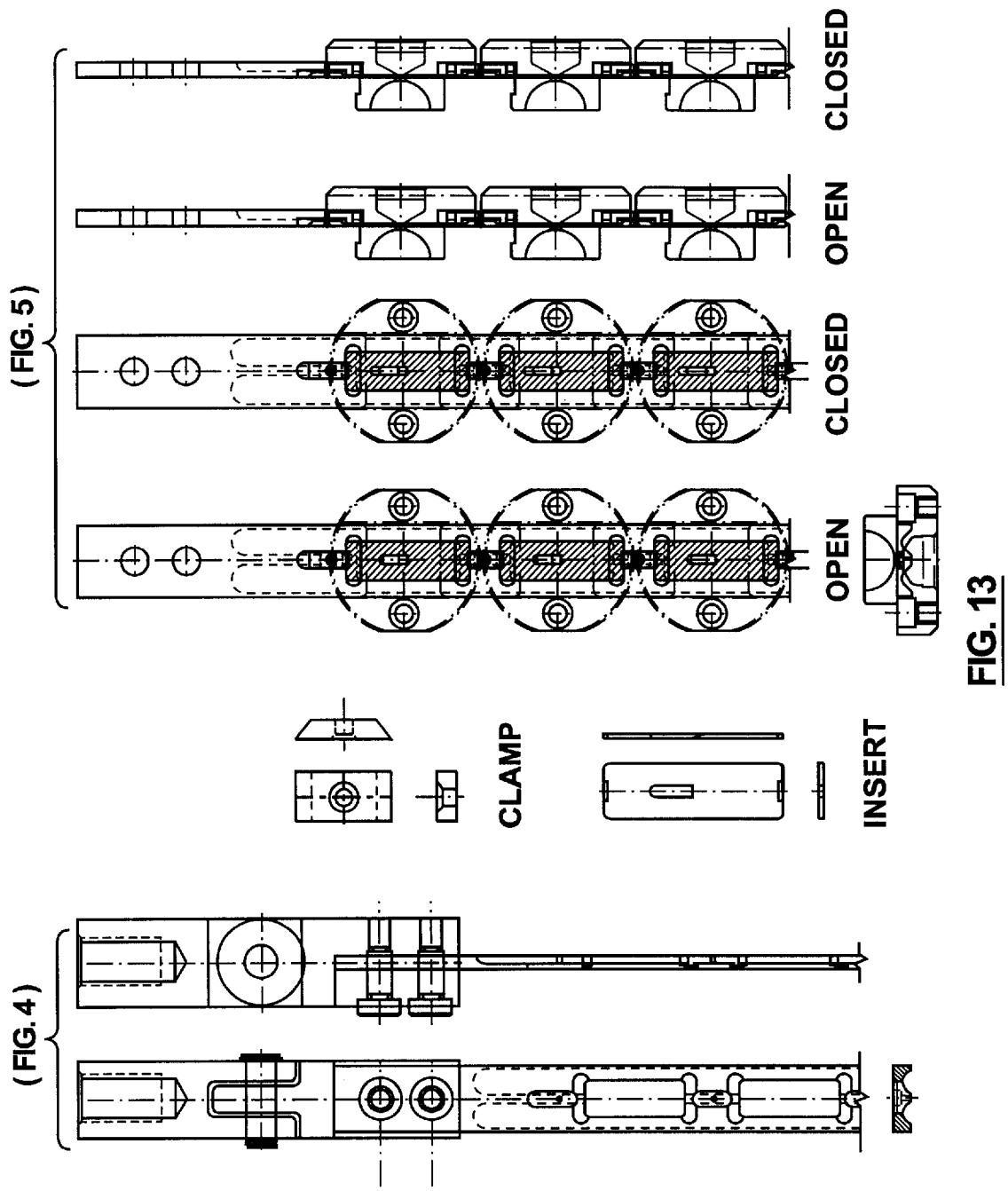

SLIDING VALVE GATE WITH INSERTS

FIELD OF THE INVENTION

The present invention relates to a valve gating apparatus for use with injection molds. More specifically, the present invention relates to an apparatus for laterally gating the flow of molten materials from an injection-molding nozzle into a mold cavity.

BACKGROUND OF THE INVENTION

In the field of injection molding, it is known that some means must be provided to inhibit the flow of molten material into the cavity of a mold so that the mold may be cooled and opened to remove the molded part. One way of achieving this inhibition is by valve gating, wherein a mechanical means is employed to inhibit the flow of material being injected into the mold cavity.

Lateral valve gating is one type of valve gating that has been developed. In lateral valve gating systems, a valve member is moved across the melt flow before or after the gate to block or allow flow through the gate. Some lateral valve gating systems typically use a stamped, or machined (one-piece) rail as the valve member. However, one-piece rails suffer from certain problems and disadvantages. For example, because the top gate on the rail carries the full cutting force of the entire rail, a one-piece rail suffers from fatigue failure through the gate area. Fatigue failure also exists through the rail clamping area due to the thin sections of a one-piece rail design. Further, high stress concentrations exist at the gate corner as a result of rail loading and the one-piece rail design.

Another problem with the one-piece rail design gating systems is the difficulty in achieving rail gate alignment between subsequent pairs of gate pad posts and rail gates. The one-piece rail design induces excessive side loads on the rail gates which cause binding, excessive actuation forces to move the rail, and premature rail failures.

See also U.S. patent application Ser. No. 09/036,132 now U.S. Pat. No. 6,146,123, Ser. No. 09/377,996, No. 09/372,174 now U.S. Pat. No. 6,149,417, and Ser. No. 09/030,593 now U.S. Pat. No. 6,056,536, the subject matter of which are incorporated herein by reference. The art cited in those is also incorporated herein by reference.

It is desired to have an apparatus for use in injection molding operations which reduces or eliminates the problems and disadvantages that exist with lateral gating systems that utilize one-piece rail design.

SUMMARY OF THE INVENTION

It is an object of the present invention to provide a novel valve gating apparatus for use in injection molding operations.

According to one aspect of the present invention, there is provided a valve gating apparatus for an injection mold nozzle assembly including a melt channel and a nozzle gate, said valve gating apparatus being positioned between the nozzle gate and a mold cavity, comprising:

at least one shutter movable between a first position wherein said shutter inhibits flow of melt material from said nozzle gate and a second position wherein said gate is in fluid communication with said mold cavity, and wherein said shutter is removably fastened to a rail member;

means to move said rail member substantially perpendicular to the direction of melt flow through said nozzle gate between first and second positions.

The present invention virtually eliminates the problems of fatigue failure that exists in one-piece rail designs. Unlike in the stamped rail design where the top gate on the rail carries the full cutting force of the entire rail, with the insert design of the present invention, a single insert carries the cutting load (force) for a single gate. Also, the "floating" aspect of the insert design eliminates side loading between subsequent gates on the rail, and therefore eliminates fatigue failures through the gate area of the rail. Furthermore, the rail clamp end design allows for greater clamping flexibility and reduces fatigue loading through the clamp area, thus eliminating fatigue failures in that area as well.

The present invention also virtually eliminates rail stretch between subsequent gates because the rigid "carrier" portion carries the full shear load during operation and the cross-sectional area and geometry of the rigid "carrier" portion of the rail are significantly different from the one-piece rail. Since rail stretch is eliminated, the need to design progressive gate spacing between subsequent gates is also eliminated and this results in the reduction of manufacturing costs. In addition, increased manufacturing tolerances on the gate pad post location and gate opening in the insert allow for a further reduction of manufacturing costs.

Other benefits of the present invention relate to the serviceability and service life of the component. Because of the design, individual inserts can be quickly replaced without the need for readjusting the position of the entire rail. With the one-piece design the entire rail must be replaced and manually readjusted even if a single gate location was damaged. The replaceable insert design significantly reduces replacement and maintenance costs. In addition, the service life of the present invention is much greater than that of the one-piece design, because the one-piece design was prone to failure after a finite number of cycles.

Furthermore, the insert design allows for the insert to be made of a different material than the rail itself. Earlier embodiments could not provide this feature since the rail itself was the element that opened and closed the channel.

BRIEF DESCRIPTION OF THE DRAWINGS

Preferred embodiments of the present invention will now be described by way of example only, with reference to the attached Figures, wherein:

FIGS. 12-1, 12-2, 12-3, and 12-4 show enlargements of the rail and insert embodiments of FIG. 12;

FIG. 13 shows the embodiments of FIGS. 4 and 5 in both the open and closed positions;

DETAILED DESCRIPTION OF THE INVENTION

Figure 3:
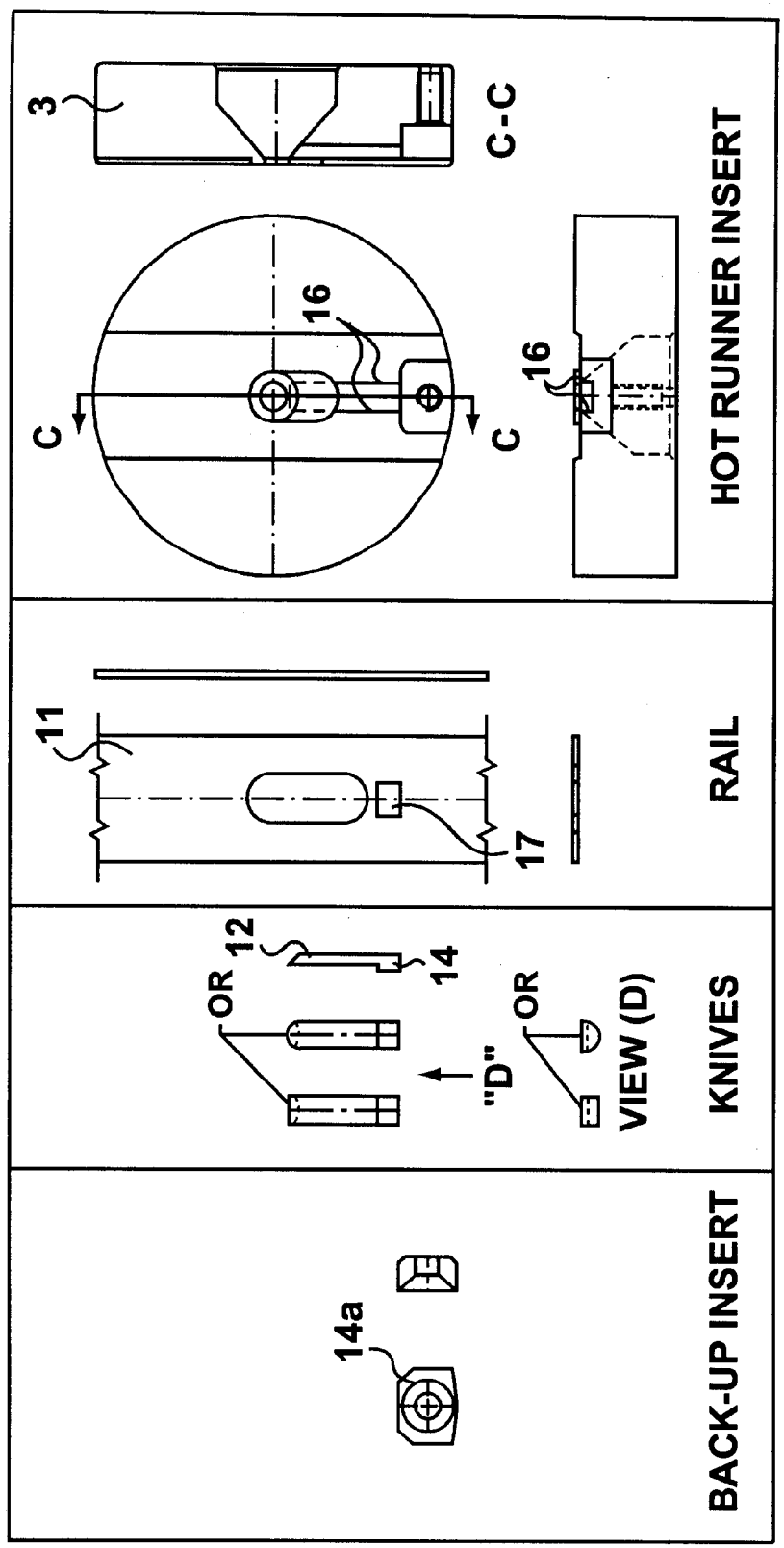
FIG. 3 shows component pieces of the sliding gate assembly for one gate.
Figures 1, 12:
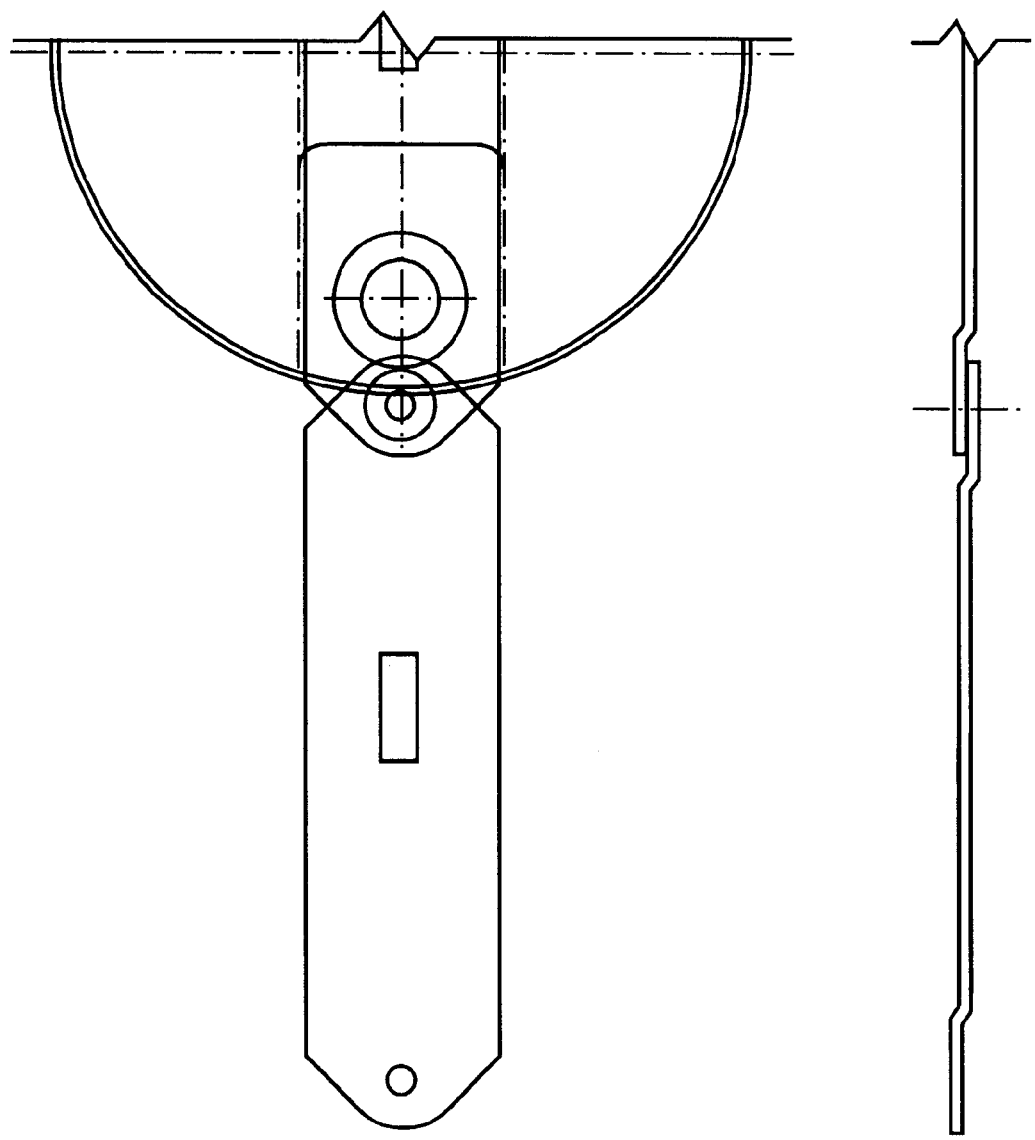
FIG. 1 shows a cross section view through a hot runner nozzle assembly with a sliding valve gate in the open position.
FIG. 12 shows four alternate rail and insert embodiments numbered 1–4.
Figures 2, 12:
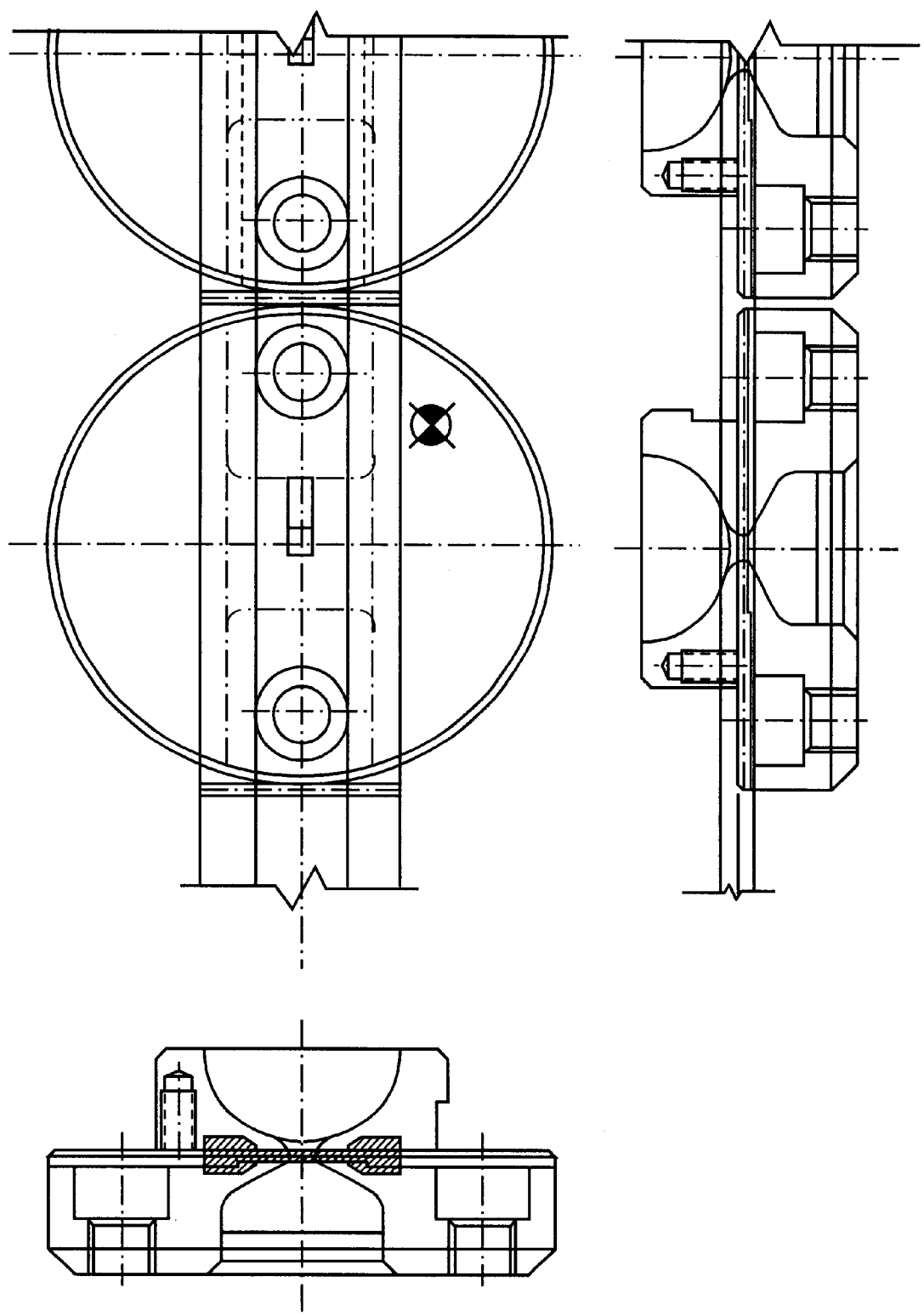
FIG. 2 shows a cross section view through a hot runner nozzle assembly with a sliding valve gate in the closed position.
Figures 3, 12:
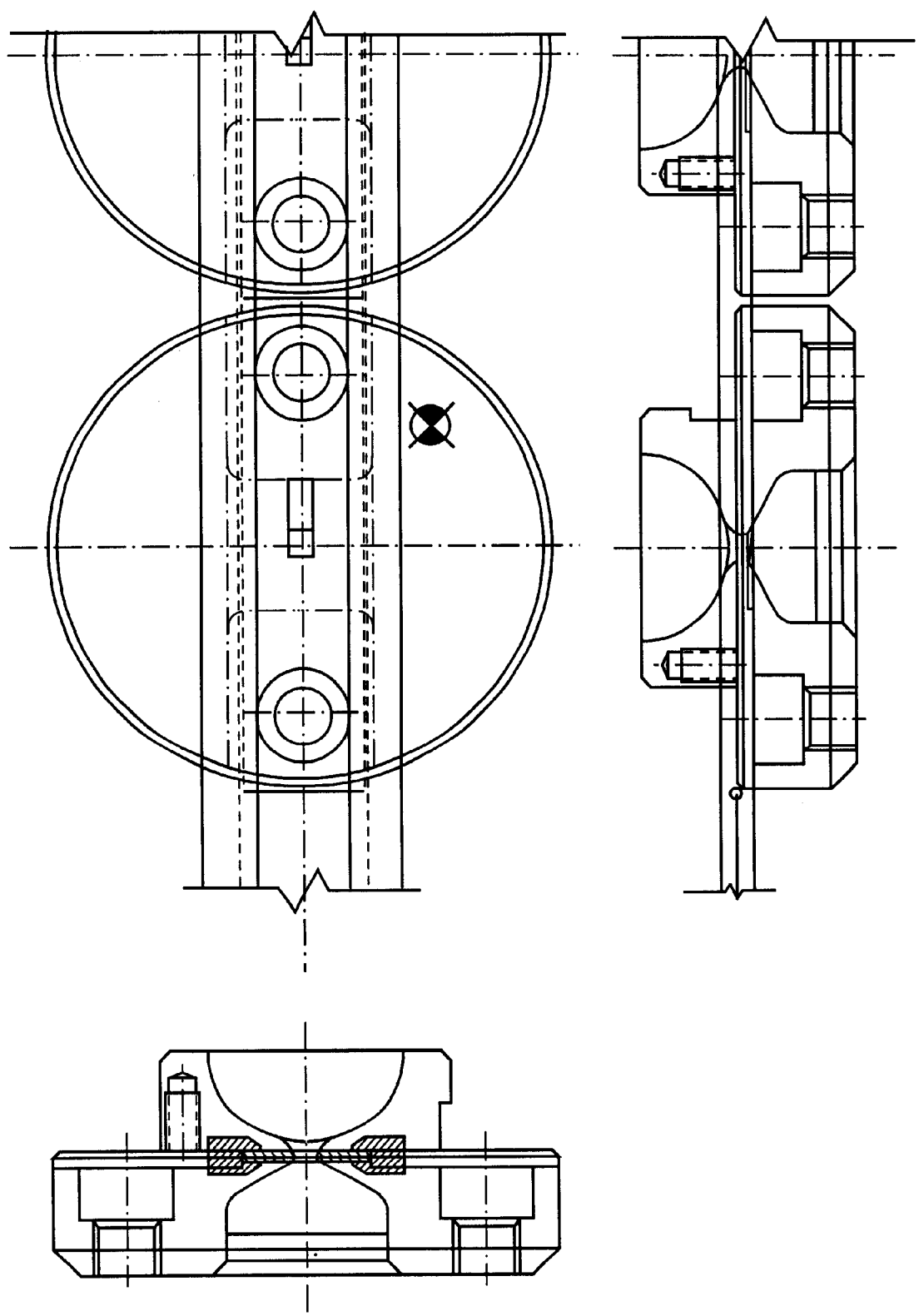
Figures 4, 12:
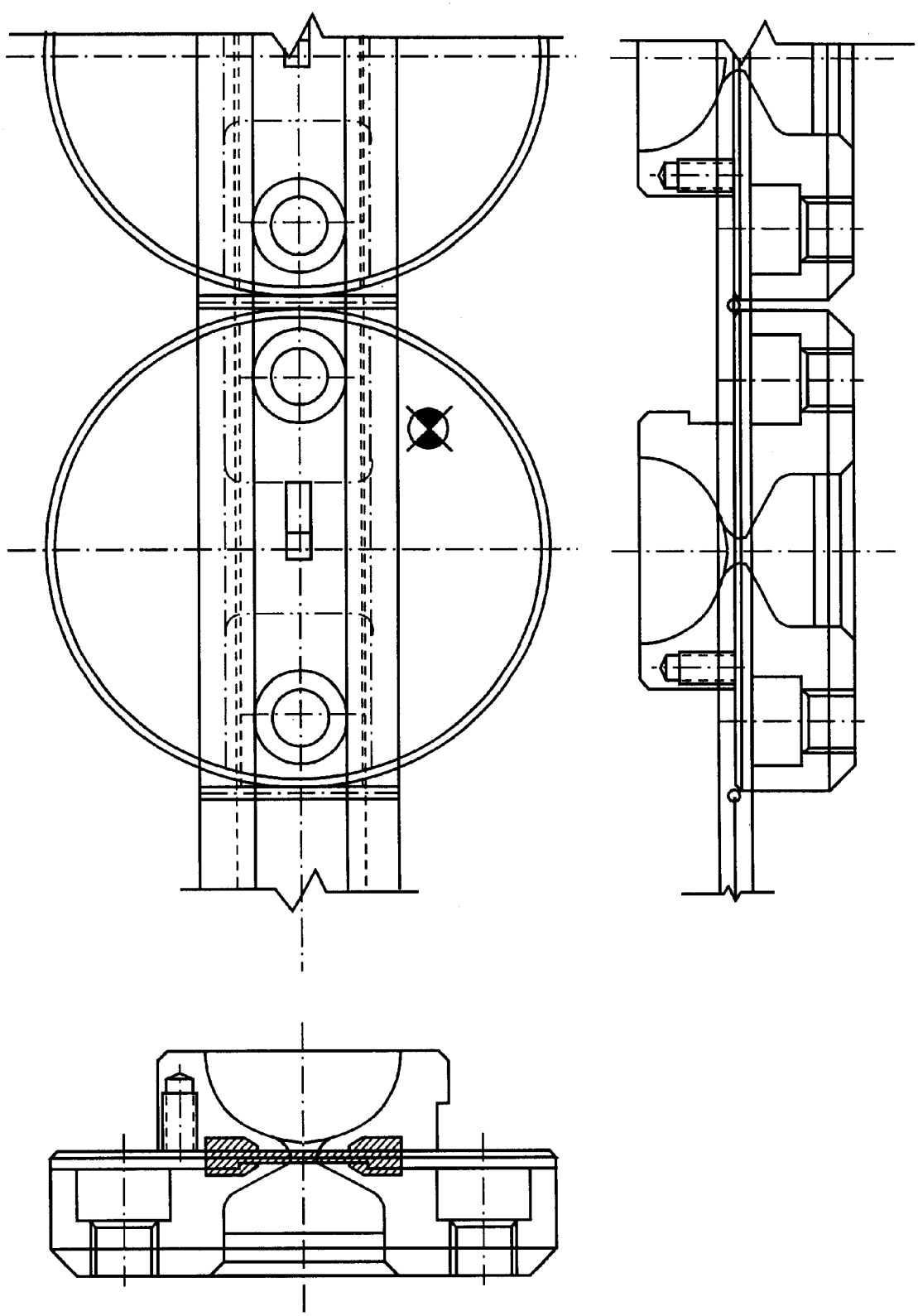

FIGS. 1–3 show an embodiment in which the sliding rail (carrier rail) 11 engages a rail insert 12 (shutter) local to an individual hot runner nozzle gate such that the movement of the rail causes the rail insert 12 to open, or close, the melt flow channel from the hot runner to the gate entry of the mold cavity. With reference to FIG. 1, hot runner nozzle body 1 contains melt flow channel 2 and is seated in hot runner insert 3 via thermal insulating sleeve 4 and also located in manifold plate 6 via spring stack 19. The nozzle body 1 is spaced from the rail insert 12 by thermal insulation insert 5 typically made of high temperature resistant material Vespel®. The hot runner insert 3 is secured to the manifold plate 6 by screws 7. Mold cavity 8 and gate insert 9 are retained in mold cavity plate 10 by means not shown. Mold cavity plate 10 is removably fastened to manifold plate 6 by screws not shown such that when said screws are removed the plates can be separated so that the sliding rail 11 and rail insert (knife or blade) 12 can be serviced while the mold is in the machine.

FIG. 1 shows the rail insert 12 in the gate open position so that melt can flow from the channel in the nozzle through the gate 13 into the mold cavity 8 to mold the part Back-up insert 14a is used to control the open position of the rail insert 12. FIG. 2 shows the closed position. The sliding rail 11 has been moved and the tongue 14 on rail insert 12 (which is engaged in a corresponding slot in the rail) has caused the rail insert 12 to move and close the channel. The leading edge of the rail insert 12 has a "knife-like" edge to cut through resin inside the melt flow channel 15, as taught in the earlier co-pending U.S. patent application Ser. No. 09/030,593. Accordingly, the function of the rail inserts 12 is to shear the hot melt stream from the molded article and to seal the cavity/gate area from the hot melt between injection molding cycles. FIG. 3 shows detailed views of the components of the assembly.

While the present invention can be employed with a single nozzle assembly, it is contemplated that it will be most useful with multi-cavity or large single-cavity molds, wherein a plurality of nozzle assemblies will be employed. Accordingly, the rail design can comprise any number of rail inserts 12 retained in a single sliding rail 11. The sliding rail 11 functions to support, retain, and facilitate motion of the individual rail inserts 12 during operation of the hot runner. The sliding rail 11 can be mounted either vertically or horizontally within the hot runner. Preferably, the clearance between the rail 11 and the runner insert 3 is between 1 and 3 one thousandths of an inch, and more preferably 2 one thousandths of an inch. Linear motion of the sliding rail 11 is provided by an external device mounted to the rail ends and this facilitates rail function. As will be apparent to those of skill in the art, the external device that provides the linear motion of the sliding rail 11 can be any known means, such as pneumatic pistons and resilient spring means.

By using a local rail insert 12 at each gate that is moved by the rail, the alignment of the rail insert 12 to the hot runner insert 3 can be effected more easily. In order to mimimize plastic leakage it is desirable that clearances are minimized without provoking seizing. Because the rail insert 12 is locating in its local hot runner insert 3, its sliding fit clearances between the sides of the rail insert 12 and the corresponding sides of recess 16 in the hot runner insert 3 can be closely controlled to minimize leakage. There is a clearance between the tongue 14 on the rail insert 12 and the sides of its corresponding hold in the rail 11 wherein it engages. The clearance is preferably between 12 and 40 one thousandths of an inch per side (see Cl and Cr in FIG. 1), more preferably 20 one thousandths of an inch per side. This clearance allows the rail to "float" with respect to multiply rail inserts 12 in a multi-cavity mold thereby facilitating the driving action of the insert 12 without comprising the insert's ability to seal. In addition, the "floating" insert design allows the rail inserts 12 to individually self-align with the post and gate structure, and eliminates the side loading forces between the blades and gate pad posts.

Another benefit is that the rail insert 12 can be made of a different material than the rail 11. Earlier embodiments could not provide this feature, as the rail itself was the element that opened and closed the channel. In the present invention, the rail insert 12 is made of case hardened steel so that its cutting action when closing is enhanced. However, inserts of different materials that are strong in compression, such as ceramics, could be used. In contrast, the rail can be made from various types of tool steel such as spring steel so that good tensile strength is provided for its operation.

FIGS. 4–7 show a preferred embodiment of the invention. In this configuration, the rail insert 20 is located and retained in cutout 21 in the sliding rail 22. This is helpful when servicing the nozzle area of the mold. In the earlier embodiment the rail inserts 12 were trapped between the sliding rail 11 and hot runner insert 3. If the sliding rail 11 was removed while the mold was mounted in the machine, that is when surface 'A—A' is aligned vertically, there is a risk that the small rail inserts 12 would fall out In the preferred embodiment, the rail inserts 20 are retained in the rail 22 by retainer 23 so that the rail, including its inserts, can be handled as an assembly during servicing in when the mold is in the machine. In this embodiment, the rail can be made thicker than the earlier embodiment allowing a more robust construction to be provided for greater reliability.

Figure 8:
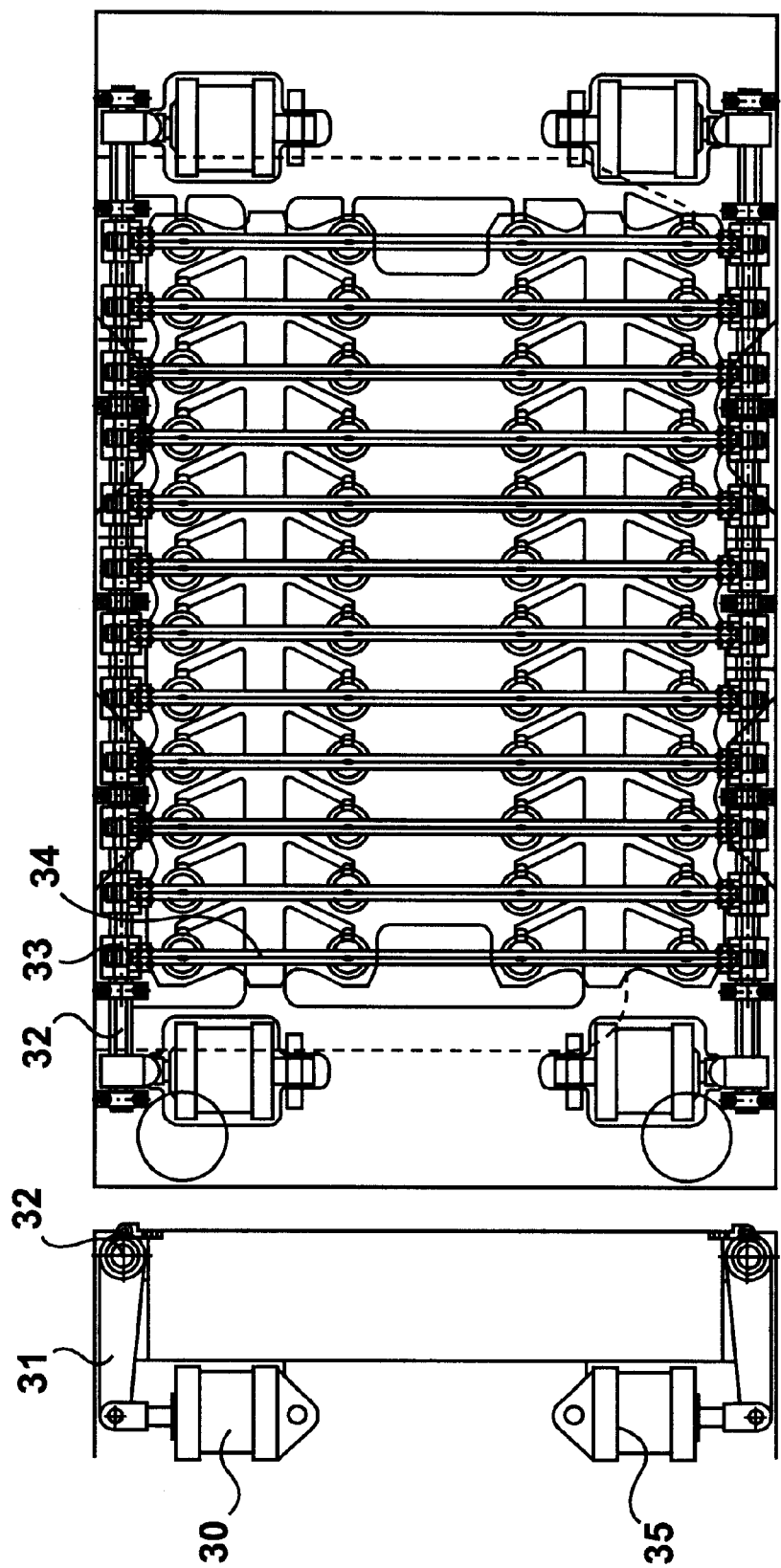
FIG. 8 shows a cavity plan view of a 48 cavity mold using transverse mounted rails each rail extending to four cavities.
Figure 9:
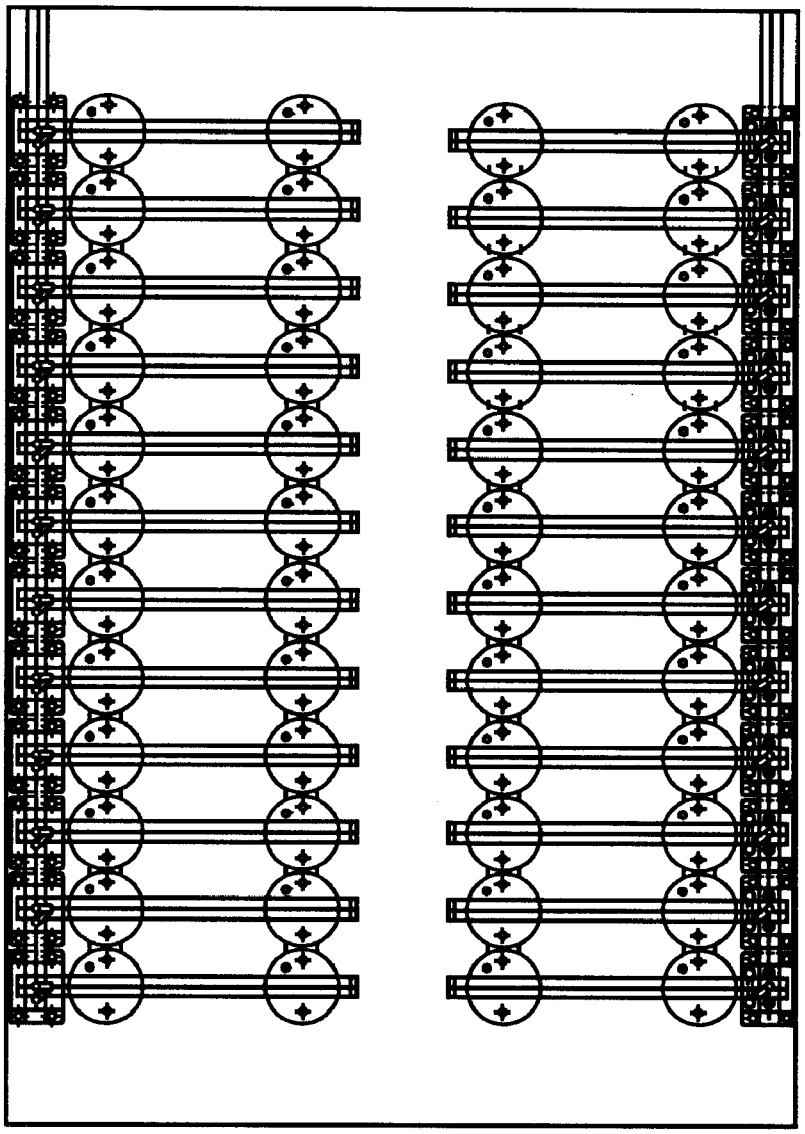
FIG. 9 shows a cavity plan view of a 48 cavity mold using transverse mounted rails each rail extending to two cavities.
Figure 10:
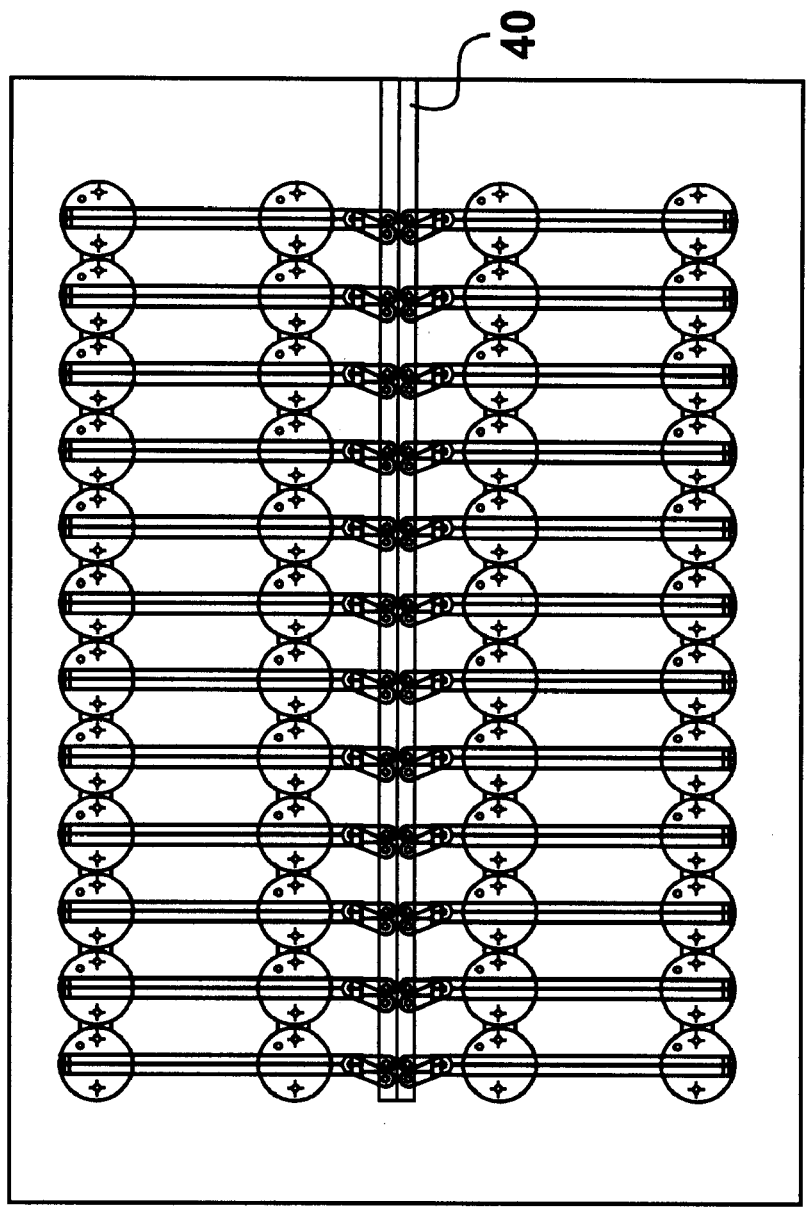
FIG. 10 shows a cavity plan view of a 48 cavity mold using transverse mounted rails each rail extending to two cavities and coupled to an adjoining rail.

FIGS. 8–10 show a variety of hot runner plan views for 48 cavity mold layouts employing sliding valve gates. The above-listed co-pending applications teach how the rail mechanism can be actuated by direct acting cylinders or by various rotary drives or by cams, etc. FIG. 8 shows a cylinder 30 actuated arm that causes rotation of shaft 32 that in turn, via a gear and rack 33, causes each rail 34 to move. In this embodiment, the rails are pulled in each direction by alternately operating the cylinders 30 and 35 so that the rail is always in tension when it moves. FIG. 9 shows an alternate embodiment in which the rail lengths are halved, each rail only serving two mold cavities, again ganged through a common drive shaft they are driven by conventional power means. FIG. 10 is yet another alternate in which the short rails of FIG. 9 are connected in a central area via cams and a central shaft 40 is translated to cause the rails to move in each direction. Although 48 cavity molds are used here to illustrate these embodiments the principles of rail actuation can be applied to any number of mold cavities.

Figure 11:
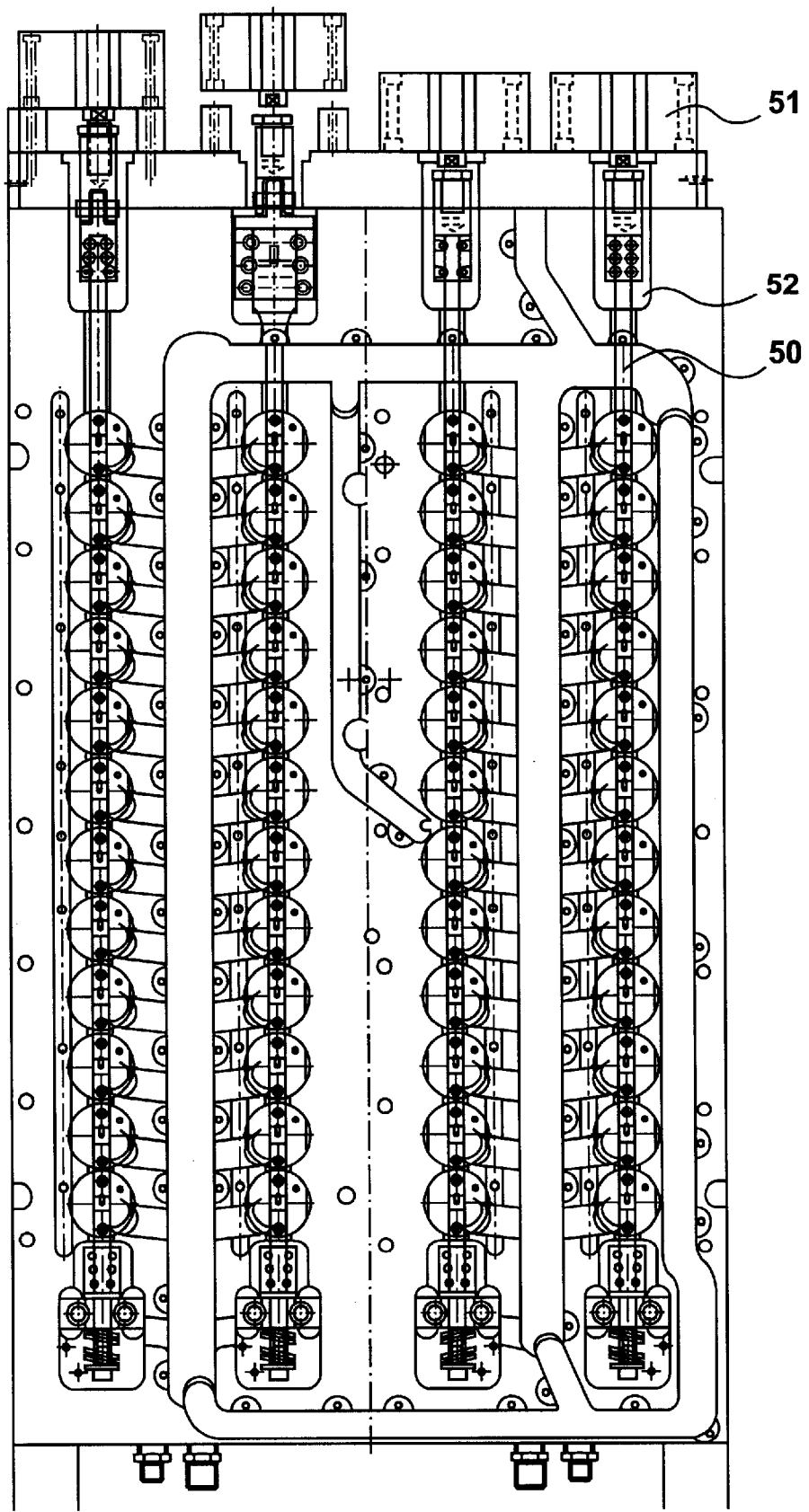
FIG. 11 shows a cavity plan view of a 48 cavity mold using longitudinally mounted rails each rail extending to twelve cavities.

The preferred rail layout for a multi-cavity mold is shown in FIG. 11. Here the rails extend the length of the mold so that only four rails are required to operate 48 valve gates, 12 for each rail. In this Figure, rails 50 are attached to their respective actuator connections 51 by a variety of alternate connection embodiments 52.

FIG. 12 shows four alternate rail and insert embodiments numbered 1–4. FIGS. 12-1, 12-2, 12-3, and 12-4 show enlargements of the alternate rail and insert embodiments numbered 1–4 in FIG. 12.

FIG. 12-1 shows a rail comprising distinct links (inserts), one for each mold gate, that are linked by removable pins to form a continuous arrangement There is an actuator at each end so that both opening and closing operations entail pulling the rail thereby ensuring the link assembly is always in tension when it moves. In this embodiment, the inserts can be stamped out of metal very cheaply.

FIG. 12-2 shows a single one-piece rail without inserts that has locally thickened sides to add strength while keeping the gate closing area comparatively thin. This is not a preferred embodiment as the alignment problem at individual gates is problematic.

FIG. 12-3 shows two parallel rails connected at their ends where they are attached to the actuator and inserts that are slotted into the rails. This embodiment is improved on by FIG. 12-4 that includes pins transversely connecting the rails at discrete intervals so as to act as spacing abutments for each insert thereby locating it with respect to its gate. The pins are removable so that the inserts can be easily changed.

Figure 4:
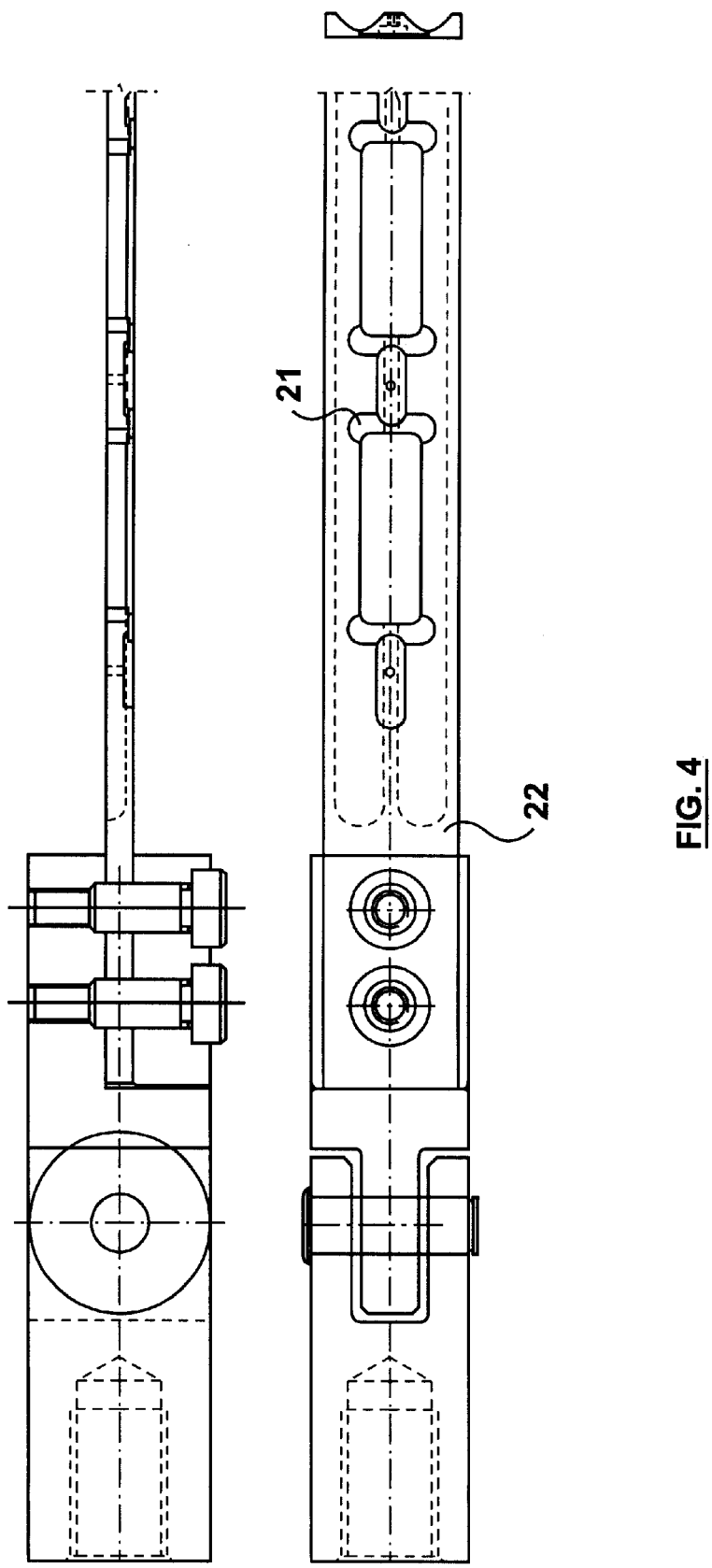
FIG. 4 shows cross section and plan views through the rail assembly attachment means to the actuator for the preferred embodiment.
Figure 5:
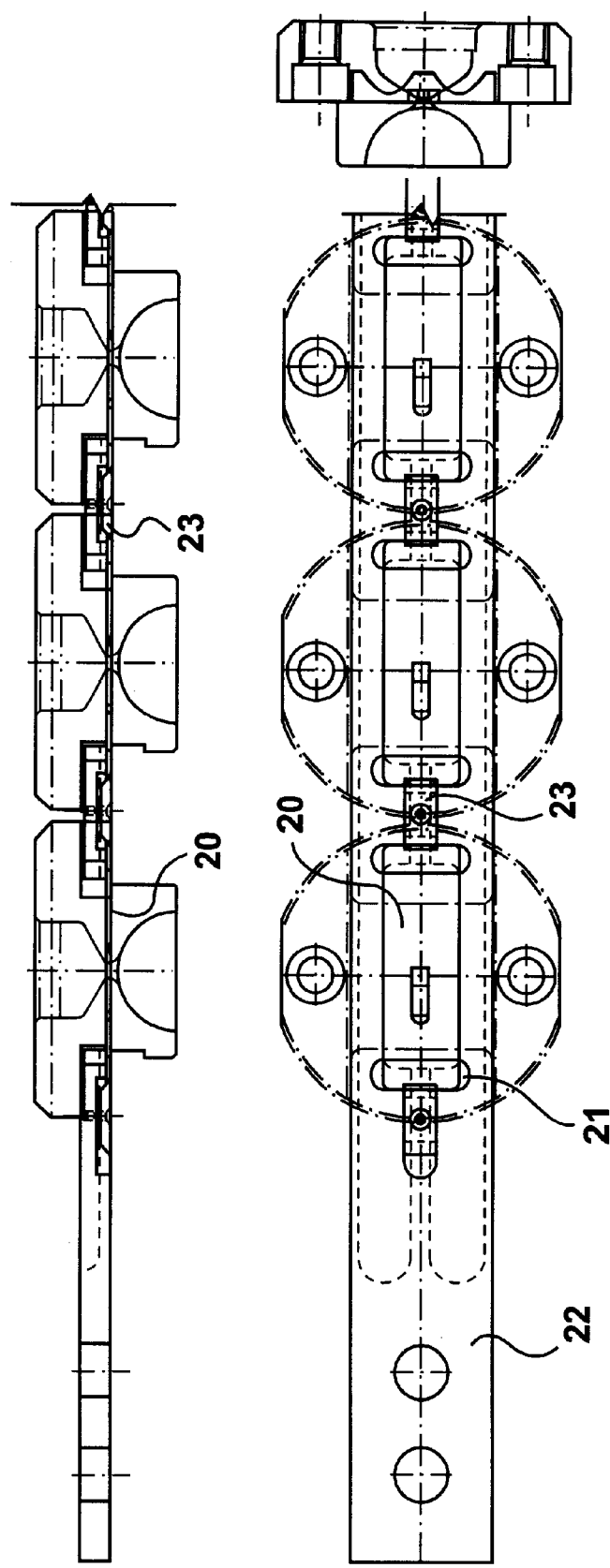
FIG. 5 shows cross section and plan views through the hot runner insert, gate insert and rail assembly for the preferred embodiment.
Figure 7:
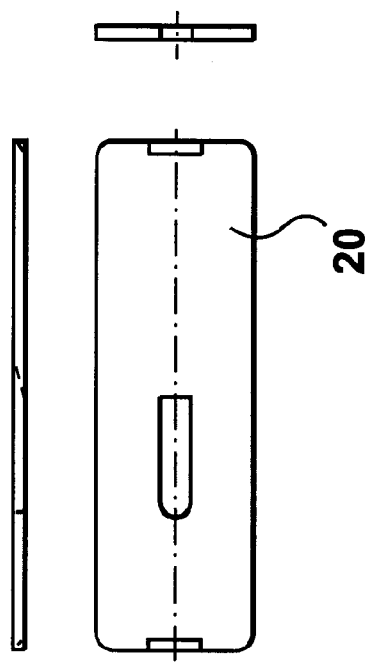
FIG. 7 shows three orthogonal views of a rail insert "knife"
Figure 6:
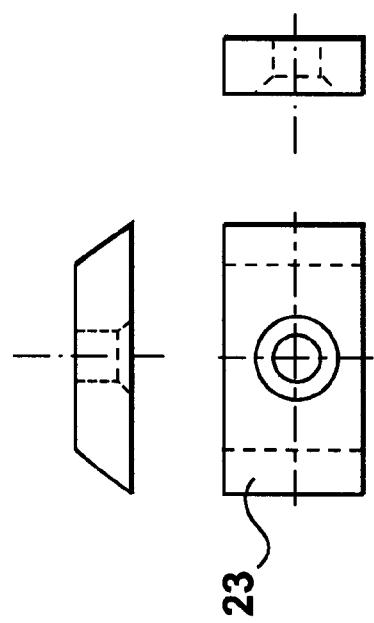
FIG. 6 shows three orthogonal views of a retainer.

FIG. 13 shows the earlier disclosed FIGS. 4 and 5. However, FIG. 13 shows the embodiments of FIGS. 4 and 5 in both the open and closed positions.

Figure 14:
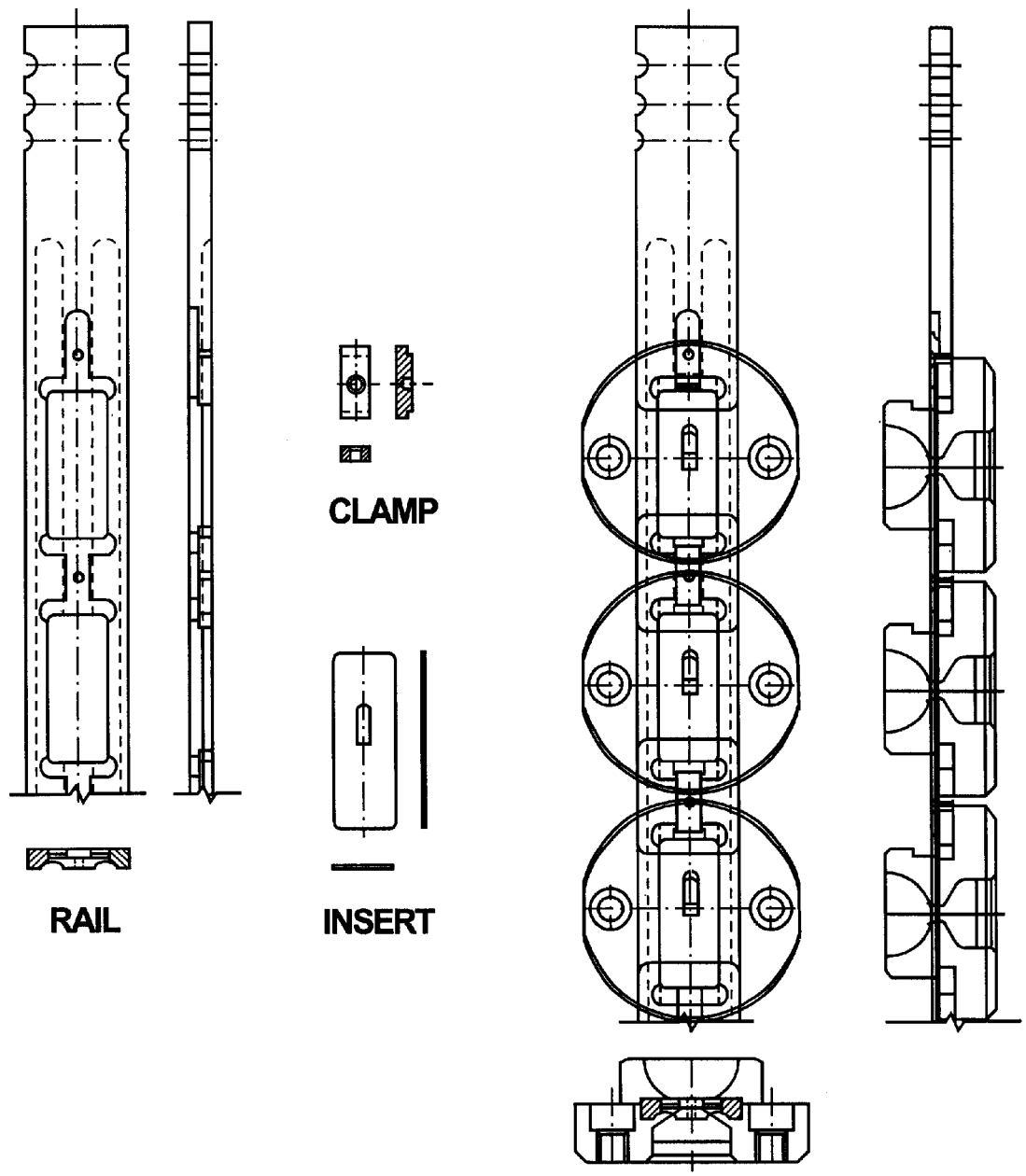
FIG. 14 shows an alternate retaining clamp for the inserts.
Figure 15:
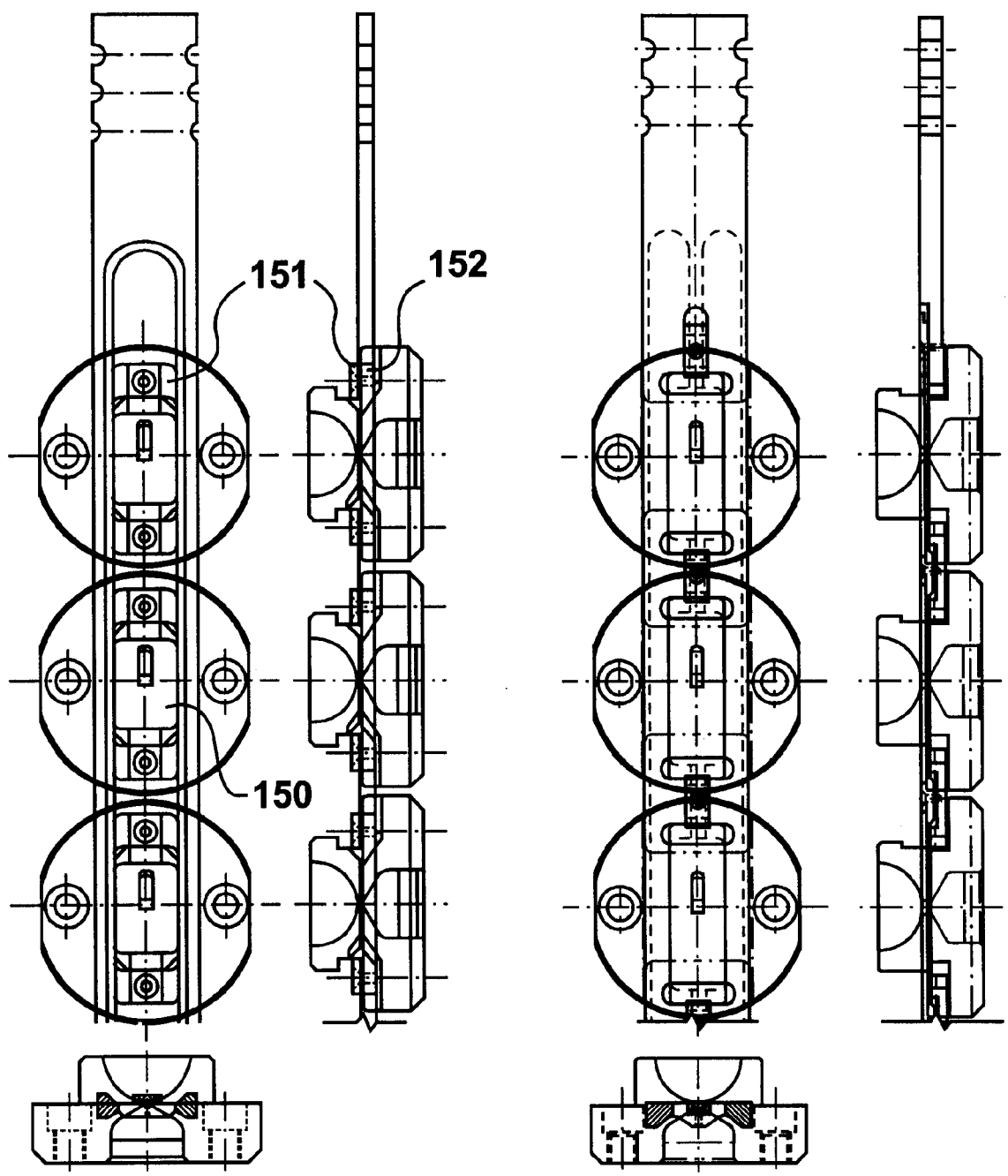
FIG. 15 shows an alternate clamp arrangement and rail assembly.

FIG. 14 shows an alternate retaining clamp for the inserts. FIG. 15 shows an alternate clamp arrangement and rail assembly. The inserts 150 are clamped between cross pieces 151 and a rail cross member 152.

Figure 16:
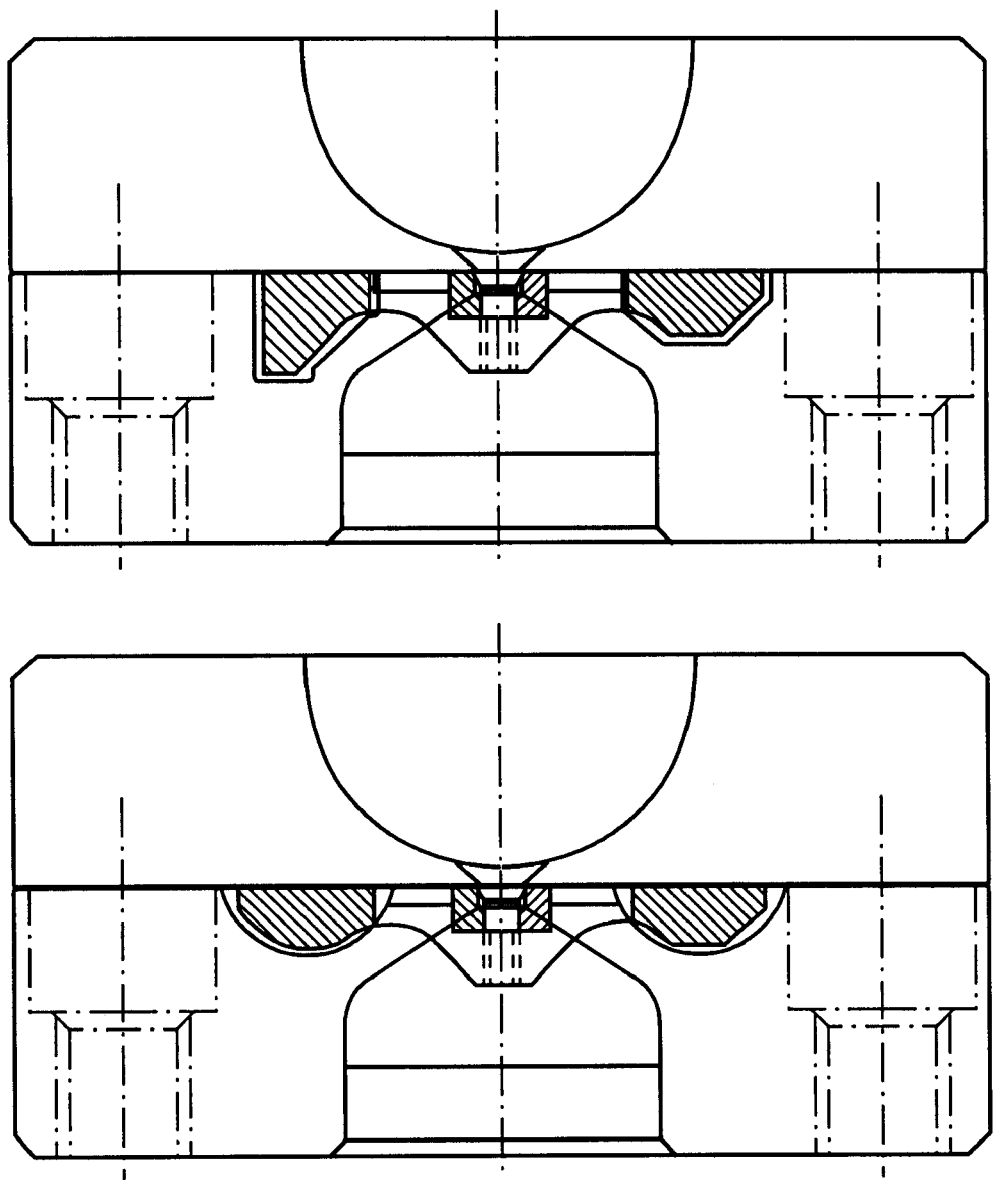
FIG. 16 shows four alternate cross sections for the rail.

FIG. 16 shows four alternate cross sections for the rail indicating how it can be locally thickened for strength or profiled to allow a corresponding change in the gate insert in order to optimize features it may require.

Figure 17:
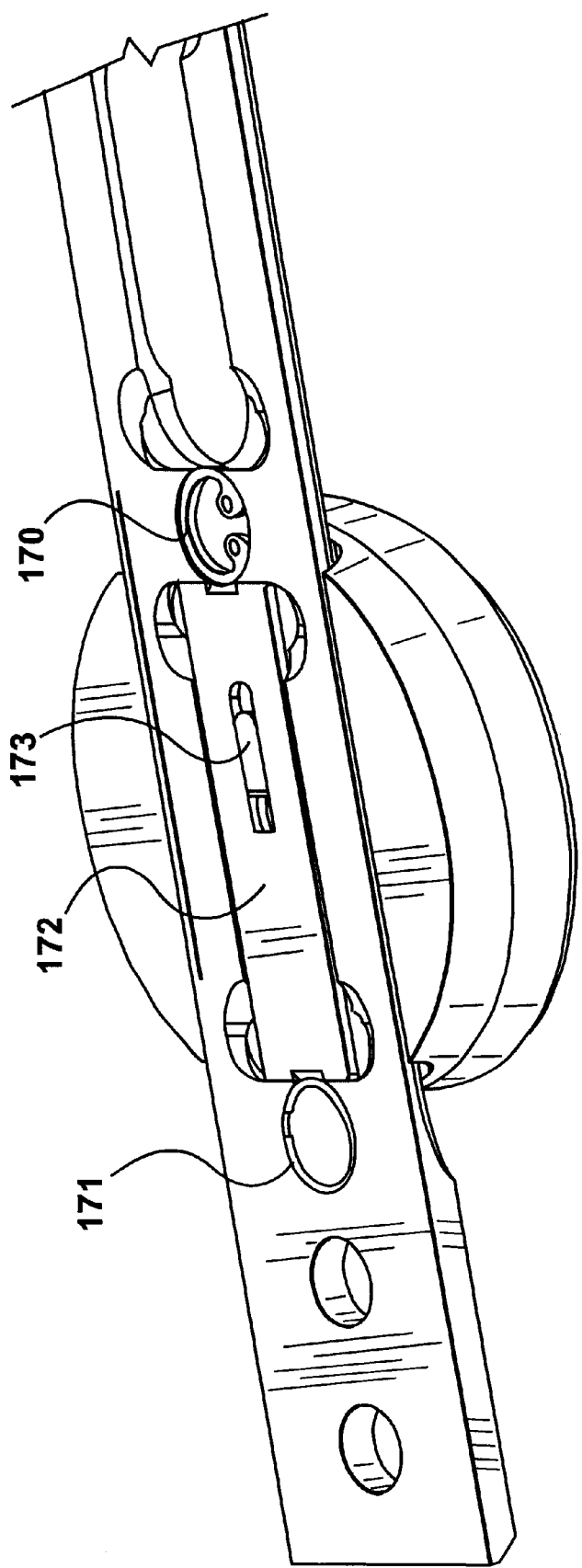
FIG. 17 shows two alternate fasteners to hold the insert in the rail in the gate open position.
Figure 18:
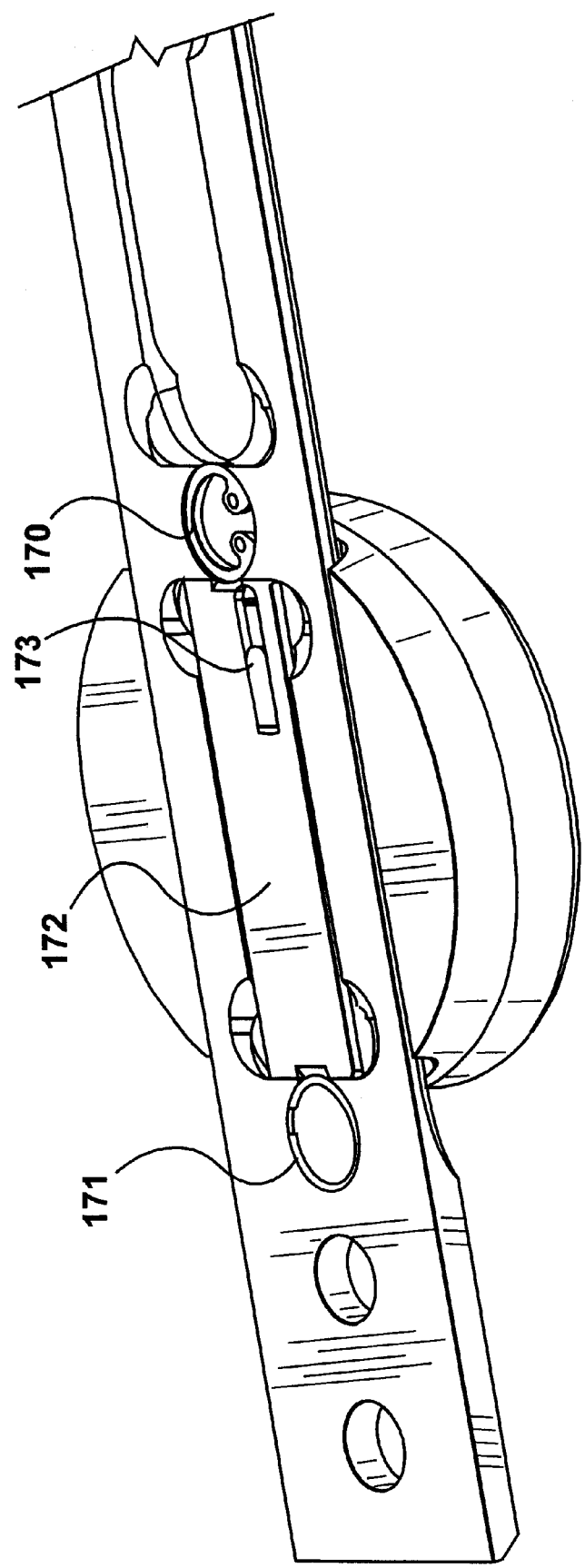
FIG. 18 shows the same two alternate fasteners of FIG. 17 in the gate closed position.

FIGS. 17 and 18 both show two alternate fasteners to hold the insert in the rail. FIG. 17 shows the gate open position and FIG. 18 shows the gate-closed position. One alternate fastener is a standard spring washer 170 and the other is a split ring 171. Both fasteners snap into a recessed opening that allows part of the fastener to press firmly against the insert 172 and hold in its recess in the rail without preventing it from self aligning with the post 173.

The above-described embodiments of the invention are intended to be examples of the present invention. Alterations and modifications may be effected thereto, by those of skill in the art, without departing from the scope of the invention which is defined solely by the claims appended hereto.

What is claimed is:

1. A valve gating apparatus for an injection mold nozzle assembly having a melt channel and a nozzle gate, said valve gating apparatus being disposed between the nozzle gate and a mold cavity, comprising:

a rail member;

at least one shutter movable between a first position wherein said shutter inhibits flow of melt material from said nozzle gate and a second position wherein said gate is in fluid communication with said mold cavity, and wherein said shutter is removably fastened to said rail member;

means to move said rail member substantially perpendicular to the direction of melt flow through said nozzle gate between said first and second positions.

2. A valve gating apparatus according to claim 1, wherein the said shutter is made of a different material than the said rail member.

3. A valve gating apparatus according to claim 1, wherein the said shutter is retained in the said rail member during servicing.

4. A valve gating apparatus according to claim 1, wherein a single rail member spans multiple nozzle gates with individual shutters for each of said nozzle gates.

5. A valve gating apparatus according to claim 4, wherein said individual shutters are operable to open and close multiple said nozzle gates.

6. Valve gate apparatus for an injection molding machine having at least one nozzle, comprising a rail member movable in a direction orthogonal to a longitudinal axis of the nozzle; and a rail insert coupled to said rail member and movable together therewith, said rail insert closing the at least one nozzle when said rail member moves in the direction orthogonal to the longitudinal axis of the nozzle.

7. Apparatus according to claim 6, wherein said rail insert has a knife edge which closes the nozzle.

8. Apparatus according to claim 6, wherein said rail insert is removably coupled to said rail member.

9. Apparatus according to claim 6, wherein said rail insert is movable with respect to said rail member.

10. Apparatus according to claim 9, wherein said rail insert is movable in a direction perpendicular to a longitudinal axis of said rail member.

11. Apparatus according to claim 6, wherein a plurality of rail inserts are coupled to said rail member for closing a respective plurality of nozzles.

12. Apparatus according to claim 9, wherein said rail insert is disposed between said rail member and the nozzle.

13. Apparatus according to claim 6, further comprising a coupling member on said rail insert coupling said rail insert to an opening in said rail member, said coupling member being movable within said opening.

14. Apparatus according to claim 6, wherein the nozzle has a recess on either side thereof, and wherein said rail insert moves within the nozzle recesses.

\* \* \* \* \*